United States Patent
Rezayee et al.

(10) Patent No.: US 9,870,558 B1
(45) Date of Patent: Jan. 16, 2018

(54) DEVICE-EMBEDDED TRANSACTION CHIP

(71) Applicant: Square, Inc., San Francisco, CA (US)

(72) Inventors: Afshin Rezayee, Richmond Hill (CA); Yue Yang, Toronto (CA); Jesse Wilson, Waterloo (CA); Kevin Ng, Markham (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/631,785

(22) Filed: Jun. 23, 2017

(51) Int. Cl.
| | | |
|---|---|---|
| *G06Q 20/38* | (2012.01) | |
| *G06Q 20/32* | (2012.01) | |
| *G06Q 20/40* | (2012.01) | |
| *G06Q 20/20* | (2012.01) | |
| *G06Q 20/36* | (2012.01) | |

(52) U.S. Cl.
CPC ....... *G06Q 20/3223* (2013.01); *G06Q 20/206* (2013.01); *G06Q 20/3227* (2013.01); *G06Q 20/3278* (2013.01); *G06Q 20/3674* (2013.01); *G06Q 20/382* (2013.01); *G06Q 20/40* (2013.01)

(58) Field of Classification Search
None
See application file for complete search history.

(56) References Cited

U.S. PATENT DOCUMENTS

| | | | | |
|---|---|---|---|---|
| 9,390,412 B2* | 7/2016 | Weber | ................ | G06Q 20/3823 |
| 9,426,127 B2* | 8/2016 | Huxham | ............. | H04L 63/0428 |
| 2010/0211507 A1* | 8/2010 | Aabye | .................... | G06Q 20/10 |
| | | | | 705/71 |
| 2014/0074637 A1* | 3/2014 | Hammad | ............... | G06Q 20/12 |
| | | | | 705/21 |
| 2015/0052064 A1* | 2/2015 | Karpenko | .......... | G06Q 20/3829 |
| | | | | 705/71 |

\* cited by examiner

*Primary Examiner* — David Bilodeau
(74) *Attorney, Agent, or Firm* — Maynard Cooper & Gale, P.C.; Brian T. Sattizahn

(57) ABSTRACT

A payment terminal can have an application processing unit coupled to a transaction processing unit. The transaction processing unit can receive payment information from a payment device via a payment interface coupled to the transaction processing unit. The transaction processing unit can encrypt the payment information in accordance with a standard payment protocol and provide the encrypted payment information and other protocol dependent information to the application processing unit. The application processing unit can execute a point-of-sale application that can have the transaction processing unit acquire the payment information and have the application processing unit transmit the encrypted payment information and other protocol-dependent information from the transaction processing unit to a payment server.

12 Claims, 7 Drawing Sheets

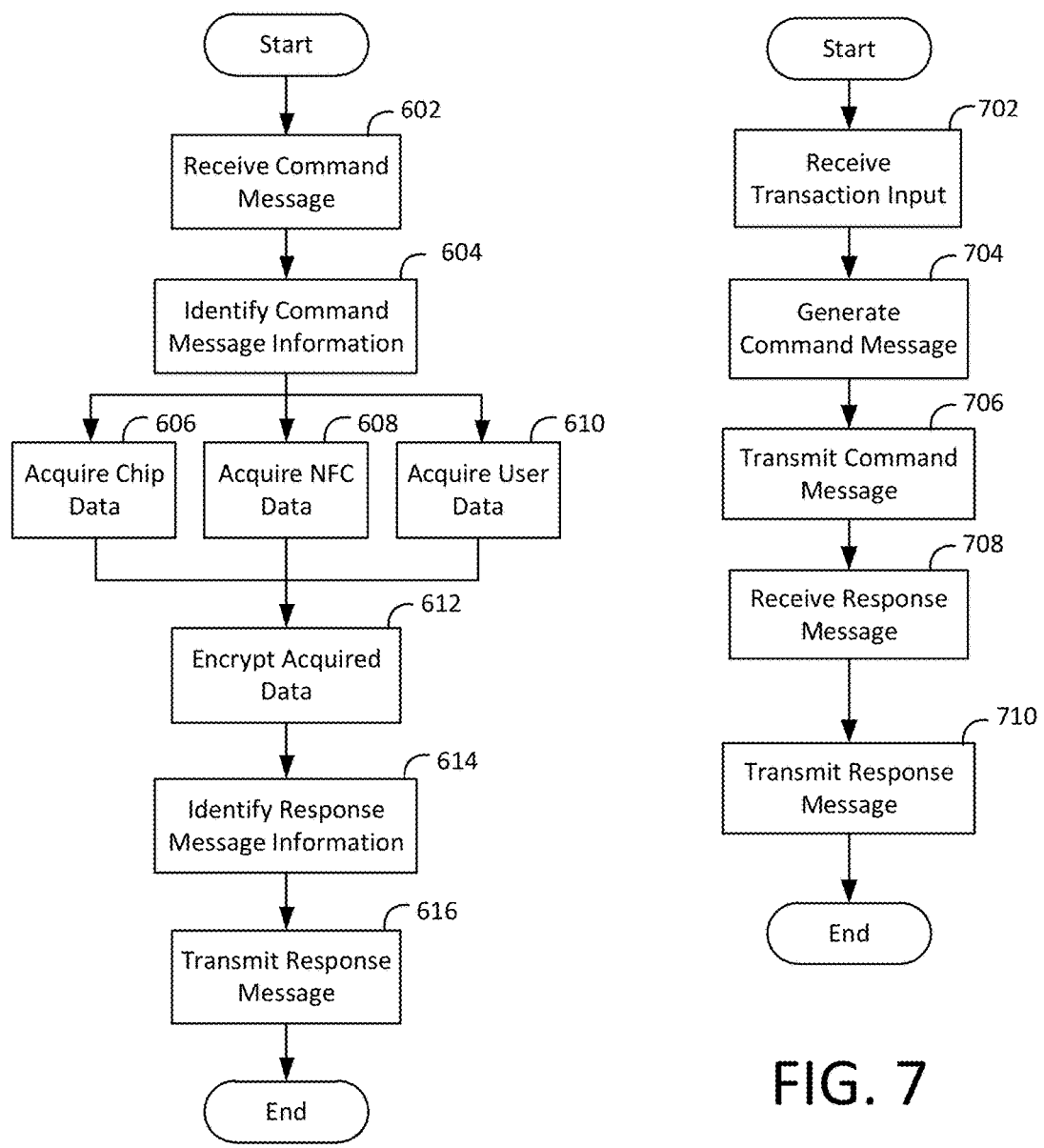

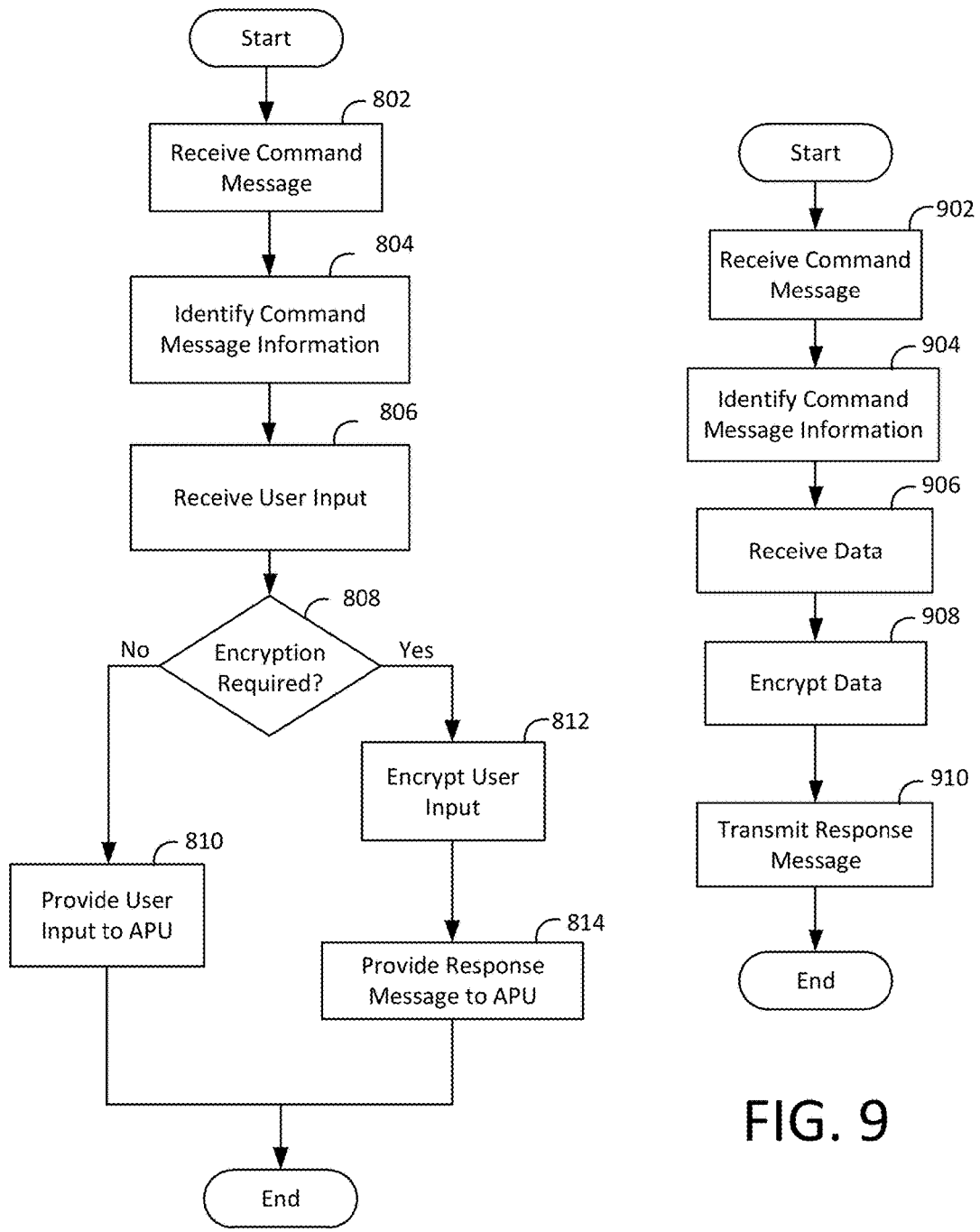

US 9,870,558 B1

DEVICE-EMBEDDED TRANSACTION CHIP

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is inserted into corresponding EMV slot of the payment terminal, and near field communication (NFC) enabled devices such as a smart phone or EMV card that is tapped at the payment terminal and transmits payment information over a secure wireless connection. The payment terminal may receive payment information from the payment device as well information about a transaction, and may communicate this information to a payment system for processing of the transaction.

In order to process the electronic payments received at the payment terminal, the payment terminal can include a transaction chip that interacts with the payment devices to exchange and generate the payment information and transaction information that is provided to the payment system. To keep critical information such as card numbers, PINs, encryption keys, passcodes, user information, transaction information, and other sensitive information secure, the payment reader (the devices that receive the payment information from the payment devices) can be connected directly to the transaction chip such that the payment information is only visible to the transaction chip. Before any information is forwarded to other devices or a payment system, the information may be encrypted by the payment device or by encryption algorithms and keys that are resident at the payment reader.

Many merchants are interested in using mobile payment terminals (i.e., payment terminals that can be moved from place to place while remaining operational to process payment transactions) for the convenience of their customers or their own convenience. For example, some merchants may travel to perform services in a manner such that a large and dedicated payment terminal, or a proliferation of smaller devices, may be tedious or uncomfortable.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 6 depicts a non-limiting flow diagram illustrating exemplary steps for processing a payment transaction with the transaction processing unit in accordance with some embodiments of the present disclosure;

FIG. 7 depicts a non-limiting flow diagram illustrating exemplary steps for processing a payment transaction by an application processing unit in accordance with some embodiments of the present disclosure;

FIG. 8 depicts a non-limiting flow diagram illustrating exemplary steps for processing a user input received at a user input interface in accordance with some embodiments of the present disclosure; and FIG. 9 depicts a non-limiting flow diagram illustrating exemplary steps for encrypting data from the application processing unit in accordance with some embodiments of the present disclosure.

DETAILED DESCRIPTION

Figure 1:
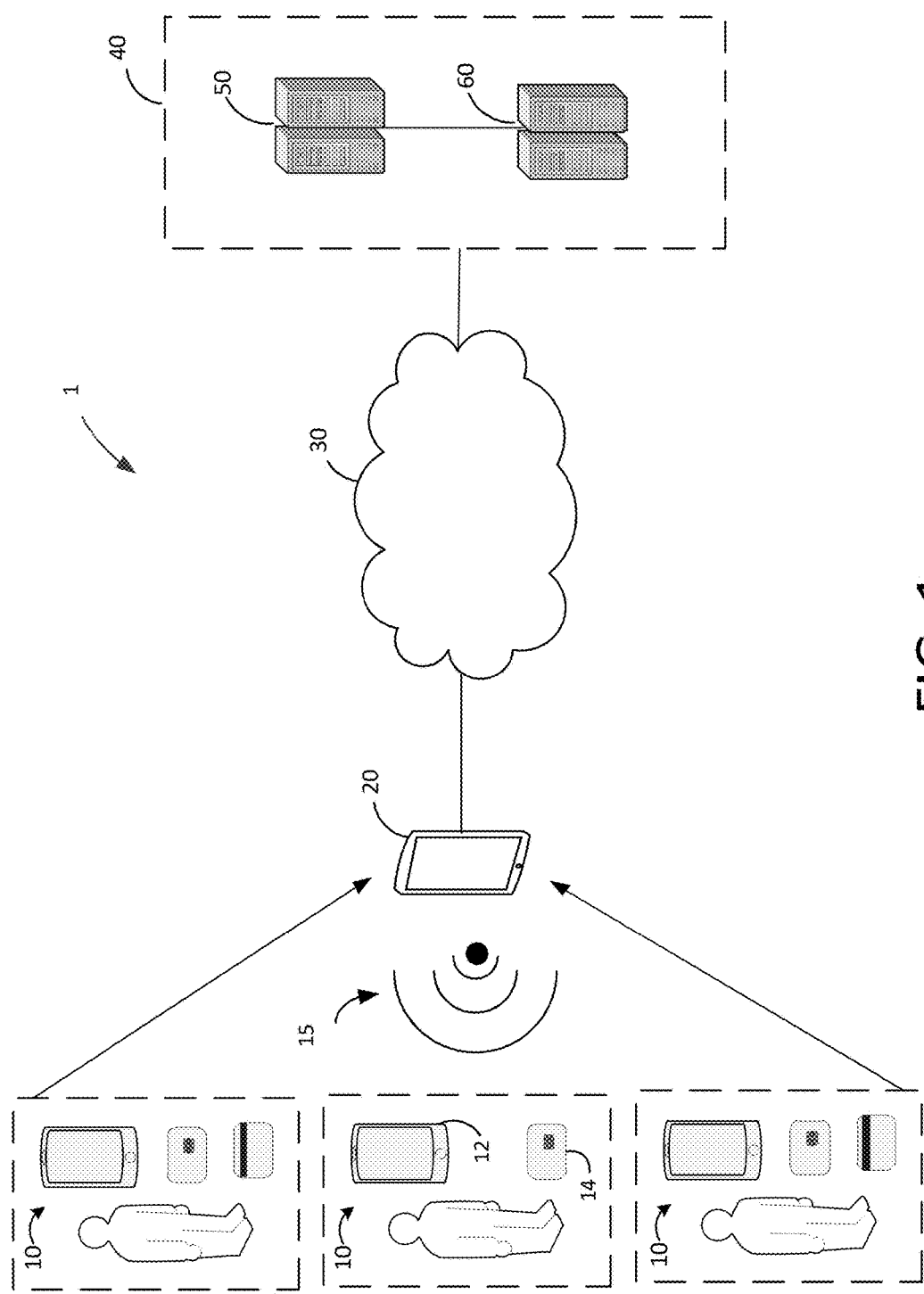
FIG. 1 shows an illustrative block diagram of a payment system in accordance with some embodiments of the present disclosure.

An electronic device such as a smartphone or tablet computer can include an integrated payment terminal to function as a payment-integrated mobile device. The terminal can include a transaction processing unit that can be used to process payment information (e.g., acquire payment information from a payment interface, encrypt the acquired payment information, and perform payment processing according to payment processing protocols for exchange of information with a payment server). The transaction processing unit can be electrically connected to an application processing unit of the electronic device by communication bus such as a serial bus that enables the application processing unit and the transaction processing unit to communicate using a suitable communication protocol (e.g., I²C, SPI, UART, USB, and GPIO). The application processing unit and the transaction processing unit can exchange messages (e.g., command messages and response messages) in the process of executing a payment transaction or other functions that have been enabled for the transaction processing unit and the application processing unit (e.g., encrypting data for the application processing unit, or of non-payment interfaces of the electronic device). The application processing unit can execute a point-of-sale application that can be used to provide command messages to the transaction processing unit to acquire the payment information and to the application processing unit to transmit encrypted payment information and other payment-related messages from the transaction processing unit to the payment server for additional processing via an Internet connection.

The transaction processing unit can also be electrically connected to one or more payment interfaces incorporated into the electronic device. The payment interfaces can receive payment information from a payment device. The payment interfaces that can be connected to the transaction processing unit can include a near field communication (NFC) interface that can receive payment information from a payment device via near field communications, a chip card interface that can receive payment information from a payment device with a chip that is inserted into the chip card interface, a magnetic strip interface and interface that can receive payment information from a payment device with a magnetic strip that is swiped in the magnetic strip interface, and other suitable manners of providing payment information. The payment information received by the payment interfaces can be provided to the transaction processing unit for performing operations including cryptographic operations based on the payment information. In addition to performing cryptographic operations based on the information received from the payment interfaces, the transaction processing unit may also perform cryptographic operations on information provided to the transaction processing unit by the application processing unit.

Operations may be performed at the transaction processing unit to process the encrypted payment information in conjunction with the payment server, for example, in accordance with EMV standard protocols. These payment processing operations may include operations such as a determining whether a transaction locally, determining how payment information is accessed from a payment device, determining how that payment information is processed, determining which cryptographic functions to perform, determining the types of communications to exchange with a payment server, and determining other suitable information related to the processing of payment transactions. These operations may be performed independently and transparently to the application processing unit, such that the application processing unit does not perform cryptographic or payment-standard processing.

The transaction processing unit may also be electrically connected to a user interface of the electronic device such that the transaction processing unit can receive payment information and/or other user inputs (e.g., a pin number) that is provided to the user interface by a user. In one embodiment, the user interface can be a touchscreen interface that can receive touch inputs from a user and may include other user interface elements such as voice, gesture recognition, etc. The touchscreen interface may receive these inputs and perform processing and operations such as cryptographic operations before providing information to the application processing unit. In some embodiments, certain inputs may be processed by the transaction processing unit before providing information to the application processing unit, while other inputs may be forwarded to the application processing unit without processing. In some embodiments, the determination of whether to process or forward the received input may be based on a setting (e.g., provided by the application processing unit) or the nature of the received input (e.g., performing cryptographic operations for payment information).

The transaction processing unit may also be electrically connected to one or more external ports on the electronic device that can receive a dongle or external device. The electrical connection between the external port and the transaction processing unit can provide a direct connection between the dongle and the transaction processing unit. When the dongle is a payment interface such as a chip card interface or a magnetic strip interface and interface, the payment information provided to the payment interface can be securely provided to the transaction processing unit. Other information provided by a dongle (e.g., user input information or sensor information) may also be processed by the transaction processing unit.

The application processing unit and transaction processing unit may exchange messages over the communication interface in order to enable a variety of communications between the processing units, including to perform functions such as initialization, data exchange, firmware upgrades, establishing settings, device setup, and other suitable functions. In an embodiment, the encryption keys used by the transaction processing unit in performing the encryption of the payment information can be injected into the transaction processing unit at the time of manufacture and can be permanently stored in a cryptographic memory of the transaction processing unit such that the encryption keys cannot be updated or changed.

FIG. 1 depicts an illustrative block diagram of a payment system 1 in accordance with some embodiments of the present disclosure. In one embodiment, payment system 1 includes a payment device 10, payment-integrated mobile device 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment-integrated mobile device 20. The customer has a payment device 10 such as a credit card having magnetic strip, a credit card having an EMV chip, or a NFC-enabled electronic device such as a smart phone running a payment application. The merchant has a payment-integrated mobile device 20, such as a smart phone or tablet computer executing a payment application and including at least one interface for receiving payment information from the payment device 10. The payment-integrated mobile device 20 can be capable of receiving and processing payment information (e.g., encrypted payment card data and user authentication data) and transaction information (e.g., purchase amount and point-of-purchase information).

In some embodiments (e.g., for low-value transactions or for payment transactions that are less than a payment limit indicated by a NFC or EMV payment device 10), the initial processing and approval of the payment transaction may be processed at payment-integrated mobile device 20. In other embodiments, payment-integrated mobile device 20 may communicate with payment server 40 over network 30. Although communication network 30 may be any suitable communication network, in one embodiment communication network 30 may be the Internet and payment and transaction information may be communicated between payment-integrated mobile device 20 and payment server 40 in an encrypted format such by a transport layer security (TLS) or secure sockets layer (SSL) protocol. In addition, the payment-integrated mobile device 20 may use the transmission control protocol/Internet protocol (TCP/IP) for communication when the network 30 is the Internet.

Although payment server 40 may be operated by a single entity, in one embodiment payment server 40 may include any suitable number of servers operated by any suitable entities, such as a payment service system 50 and one or more banks of the merchant and customer (e.g., a bank server 60). The payment-integrated mobile device 20 and the payment server 40 communicate payment and transaction information to determine whether the transaction is authorized. For example, payment-integrated mobile device 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment-integrated mobile device 20 over network 30 to indicate whether or not the payment transaction is authorized. Payment server 40 may also transmit additional information such as transaction identifiers to payment-integrated mobile device 20.

Based on the information that is received at payment-integrated mobile device 20 from payment server 40, the merchant may indicate to the customer whether the transaction has been approved. In some embodiments such as a chip card payment device, approval may be indicated at the payment-integrated mobile device 20, for example, at a screen of a payment-integrated mobile device 20. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In one embodiment, payment device 10 may be a device that is capable of communicating with payment-integrated mobile device 20, such as a NFC device 12 or an EMV chip card 14. Chip card 14 may include a secure integrated circuit that is capable of communicating with a payment-integrated mobile device 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with a corresponding interface of payment-integrated mobile device 20 (e.g., in accordance with ISO 7816) and in some embodiments, may be inductively coupled to payment-integrated mobile device 20 via a near field 15. A chip card 14 that is inductively coupled to payment-integrated mobile device 20 may communicate with payment-integrated mobile device 20 using load modulation of a wireless carrier signal that is provided by payment-integrated mobile device 20 in accordance with a wireless communication standard such as ISO 14443.

NFC device 12 may be an electronic device such as a smart phone, tablet computer, or smart watch that is capable of engaging in secure transactions with payment-integrated mobile device 20. NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment-integrated mobile device 20 via near field 15 and may communicate with payment-integrated mobile device 20 by active or passive load modulation of a wireless carrier signal provided by payment-integrated mobile device 20 in accordance with one or more wireless communication standards such as ISO 14443 and ISO 18092.

The payment-integrated mobile device 20 can have a point-of-sale or payment application that may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information.

In some embodiments, the payment-integrated mobile device 20 executes a point-of-sale application that provides a user interface for the merchant and facilitates communication between payment device 10 and the payment server 40. As described herein, a payment device 10 such as NFC device 12 or chip card 14 may communicate with payment-integrated mobile device 20 via inductive coupling. This is depicted in FIG. 1 as near field 15, which includes a wireless carrier signal having a suitable frequency (e.g., 13.56 MHz) emitted from payment-integrated mobile device 20.

Figure 2:
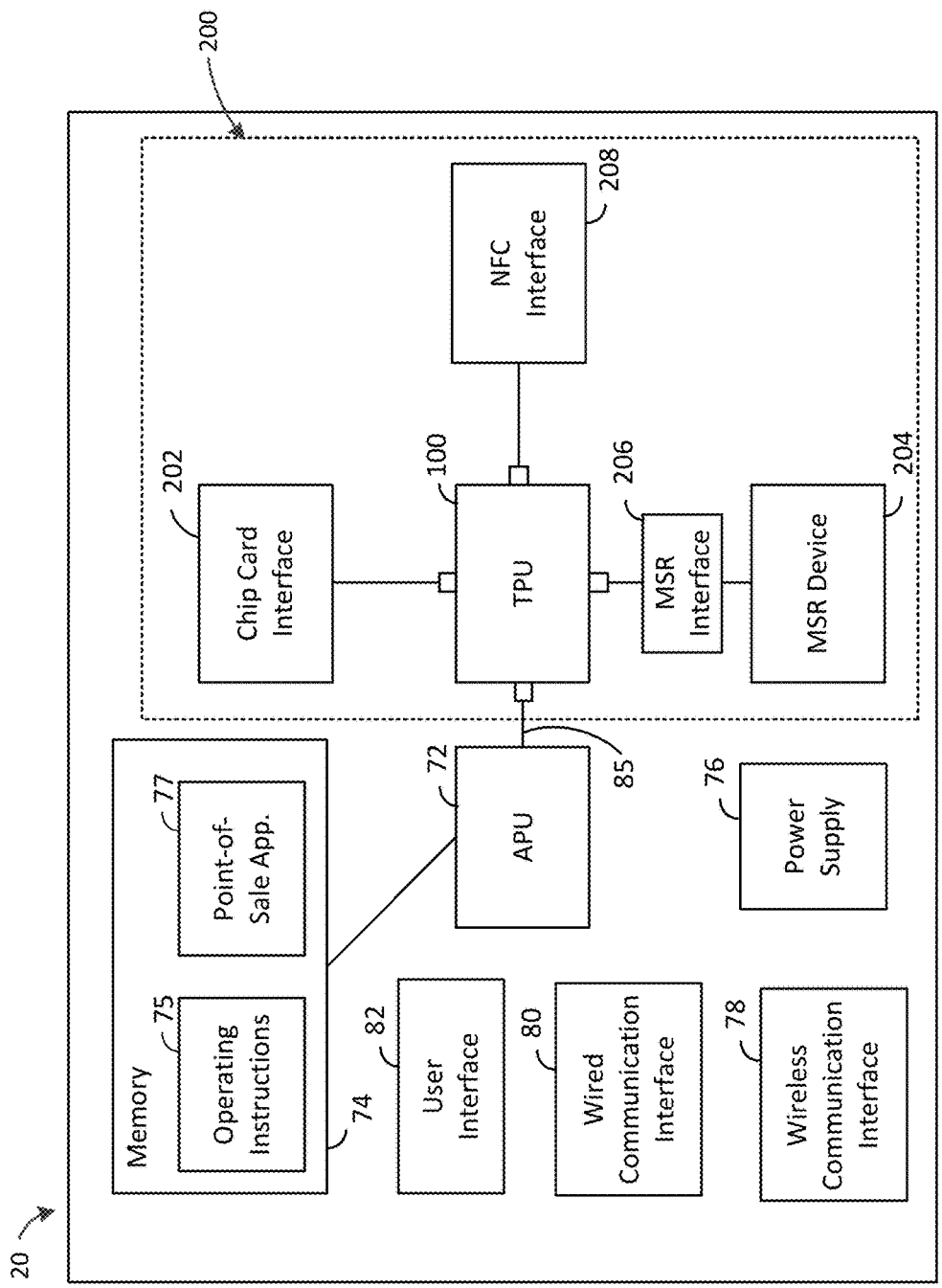
FIGS. 2-4 depict illustrative block diagrams of payment-integrated mobile devices in accordance with some embodiments of the present disclosure.
Figure 3:
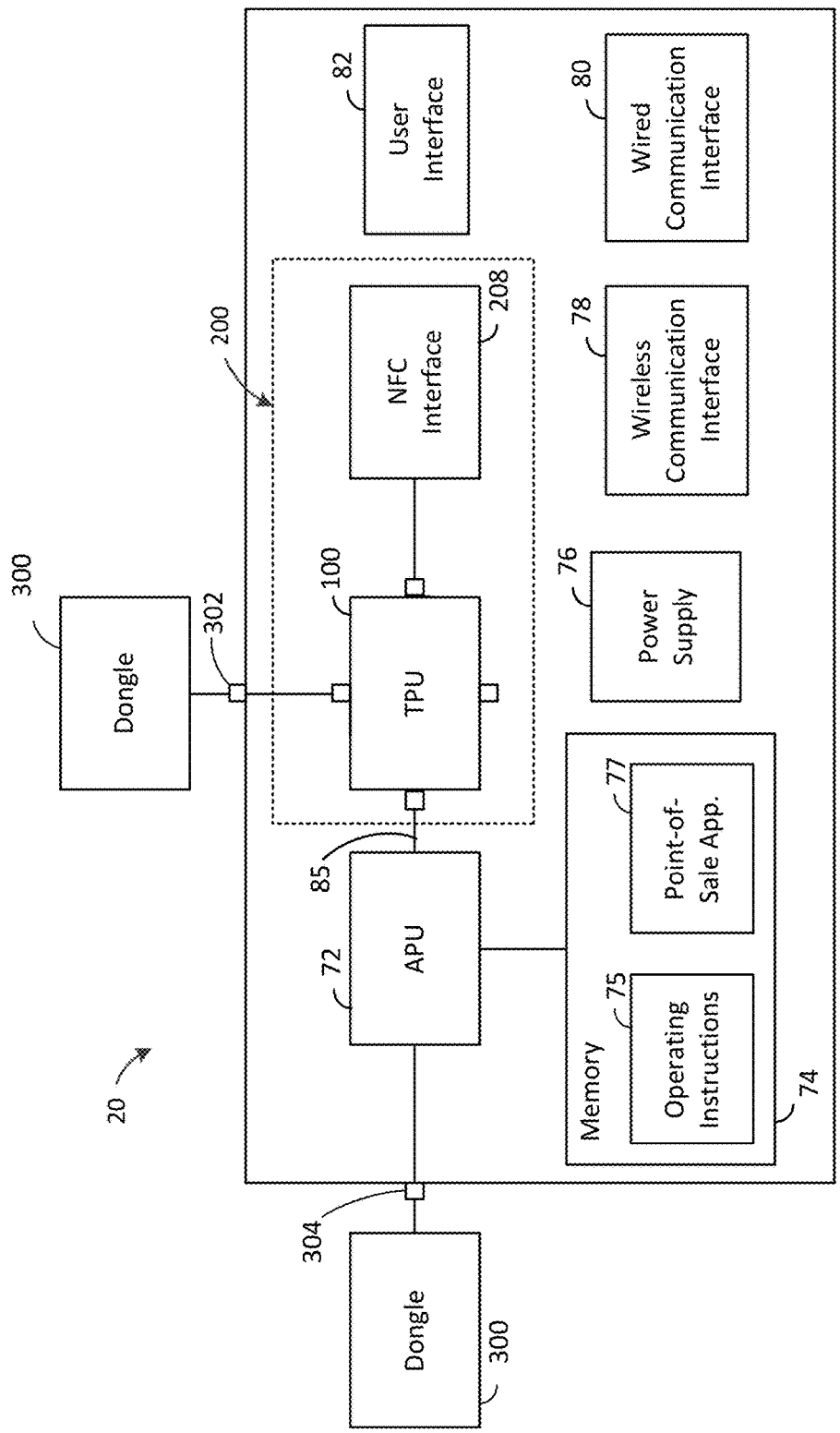
Figure 4:
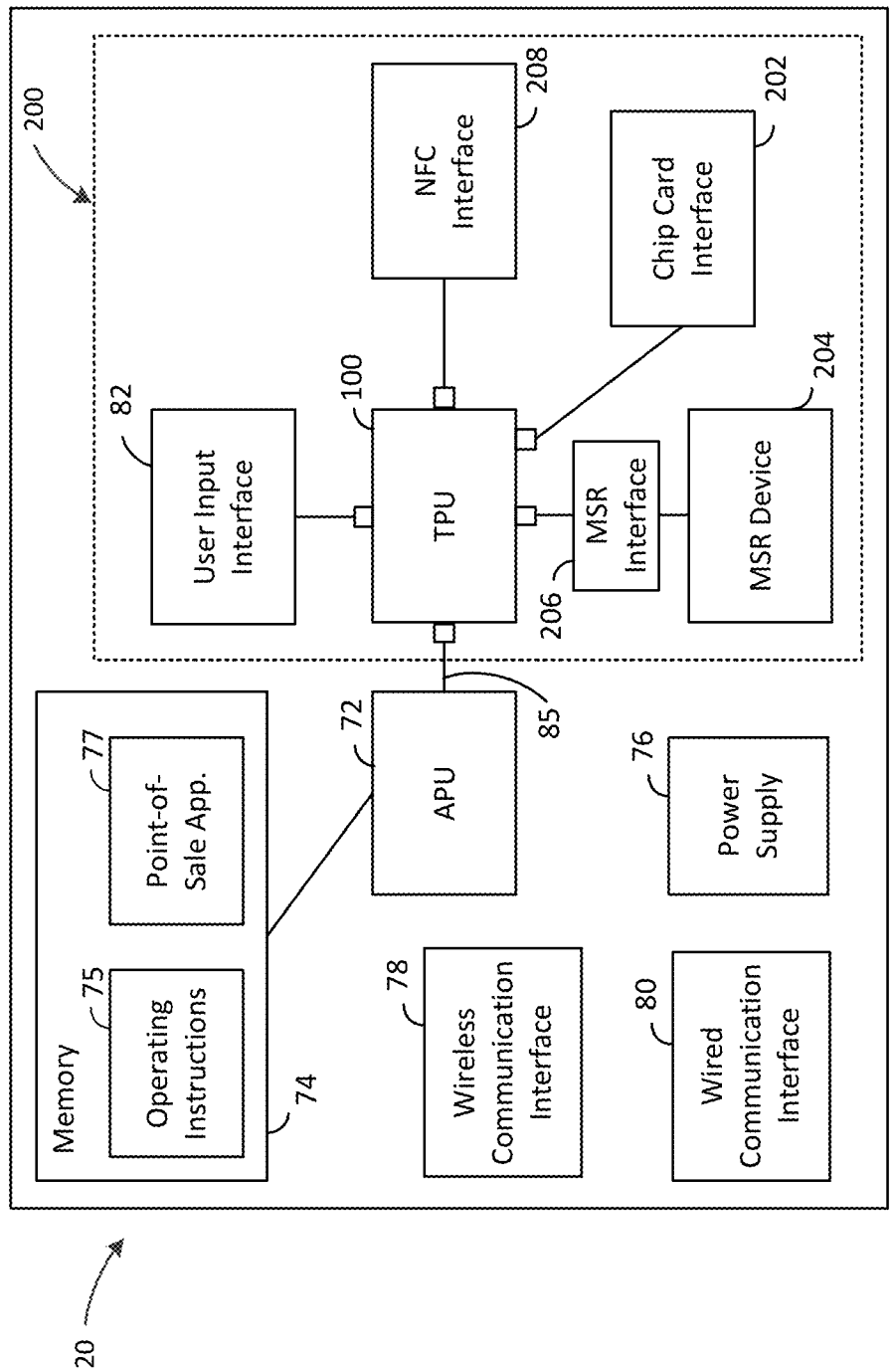

FIGS. 2-4 depict illustrative block diagrams of payment-integrated mobile device 20 in accordance with some embodiments of the present disclosure. Although particular components are depicted in particular arrangements in FIGS. 2-4, it will be understood that payment-integrated mobile device 20 may include additional components, one or more of the components depicted in FIGS. 2-4 may not be included in the payment-integrated mobile device 20, and the components of the payment-integrated mobile device 20 may be rearranged in any suitable manner.

In the embodiment of the payment-integrated mobile device 20 shown in FIG. 2, the payment-integrated mobile device 20 can include a payment-integrated mobile device 20, such as a smart phone or tablet computer, that has a payment terminal subsystem 200 integrated into the payment-integrated mobile device 20 such that the payment terminal subsystem 200 can interact with one or more of the components of the payment-integrated mobile device 20. The payment-integrated mobile device 20 can include an application processing unit (APU) 72, a general memory 74, a power supply 76, a wireless communication interface 78, a wired communication interface 80, and a user interface 82. In one embodiment, the application processing unit 72 and general memory 74 can be configured in a particular manner and incorporated into payment-integrated mobile device 20 as separate components. However, it will be understood that application processing unit 72 and general memory 74 may be configured in any suitable manner to provide the desired functionality for the payment-integrated mobile device 20. It will also be understood that the functionality of the application processing unit 72 may be embodied in a single chip or a plurality of chips, each including any suitable combination of processing units and memory to collectively perform the functionality of application processing unit 72.

In some embodiments, application processing unit 72 of payment-integrated mobile device 20 may be a suitable processor and may include hardware, software, memory, and circuitry as is necessary to perform and control the functions of payment-integrated mobile device 20. Application processing unit 72 may include one or more processors, and may perform many of the operations of the payment-integrated mobile device 20 based on instructions in any suitable number of memories and memory types. In some embodiments, application processing unit 72 may have multiple independent processing units, for example a multi-core processor or other similar component. Application processing unit 72 may execute instructions stored in memory 74 to control the operations of payment-integrated mobile device 20. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

As used herein, memory may refer to any suitable tangible or non-transitory storage medium. Examples of tangible (or non-transitory) storage medium include disks, thumb drives, memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Memory 74 may include a plurality of sets of instructions for performing the processing operations of payment-integrated mobile device 20, such as operating instructions 75, point-of-sale application instructions 77, and any other suitable instructions for operating the payment-integrated mobile device 20 (e.g., instructions related to the operation of one or more other applications or components of the payment-integrated mobile device 20 other than the payment terminal subsystem 200).

Operating instructions 75 may include instructions for controlling any suitable general operations of the payment-integrated mobile device 20, such as internal communications, power management, control of I/O devices, control of communication devices, control of other hardware of the payment-integrated mobile device 20, any other suitable instructions, or any combination thereof. In one embodiment, the operating instructions may provide instructions for the operating system of the payment-integrated mobile device 20 as well as most drivers, programs, and applications operating on the payment-integrated mobile device 20.

Operating instructions 75 may include instructions for controlling the operations of interface components such as a user interface 82, sensors, or other components that allow the electronic device to interact with external users or the environment. The interfaces may be controlled in accordance with the instructions of programs and applications such as integrated or third party applications running on the electronic device (not depicted). An example of such applications may be a point-of-sale application, which may operate according to the point-of-sale application instructions 77.

Operating instructions 75 and/or point-of-sale application instructions 77 may also include instructions for interacting with a payment terminal subsystem 200 and for interacting with a payment service system 50 at a payment server 40. The payment terminal subsystem 200 and/or the point-of-sale application executing on the payment-integrated mobile device 20 may be known (e.g., via a registration process) to the payment service system 50, such that the payment-integrated mobile device 20 may process payments with the payment service system 50 according to the point-of-sale application instructions 77. In one embodiment, the operating instructions 75 and/or point-of-sale application instructions 77 can include instructions or messages to perform a variety of functionality in concert with the payment terminal subsystem 200, in order to perform functions such as requesting cryptographic operations to be performed, performing payment operations, providing or receiving software updates, and other similar operations. For example, a non-exhaustive list of instruction types that may be used in order to perform point-of-sale functionality with the transaction processing unit 100 are provided in Table 1:

TABLE 1

| Instruction/Message | Description |
| --- | --- |
| Encrypt Data | Encrypt data provided to serial interface |
| Read NFC | Acquire payment information from NFC interface |
| Read Chip | Acquire payment information from chip card interface |
| Read UI | Acquire user input data from user input interface |
| Test | Perform functionality test on payment interfaces |
| Process Transaction | Process a payment transaction based on payment information provided to serial interface |

Point-of-sale application instructions 77 include instructions for running a point-of-sale application on the payment-integrated mobile device 20. When executed by the application processing unit 72, the point-of-sale application instructions 77 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. Further, at an appropriate time within the transaction process, the point-of-sale application may send a message to the payment terminal subsystem 200 (e.g., via connection 85) such that the payment terminal subsystem 200 can receive payment information from the payment device 10. In some embodiments, the point-of-sale application instructions 77 may include instructions for providing a rich display of information relating to fraudulent transactions and tamper attempts, and options for selection of corrective action to take in response to fraudulent transactions and tamper attempts.

Power supply 76 may include one or more power supplies such as a physical connection to AC power, DC power, or a battery. Power supply 76 may include power conversion circuitry for converting an AC or DC power source into a plurality of DC voltages for use by components of payment-integrated mobile device 20. When the power supply 76 includes a battery, the battery may be charged via a physical power connection, via inductive charging, or via any other suitable method. Although not depicted as physically connected to the other components of the payment terminals in FIGS. 2-4, power supply 76 may supply a variety of voltages to the components of the payment-integrated mobile device 20 and the payment terminal subsystem 200 in accordance with the requirements of those components.

Wireless communication interface 78 may include suitable wireless communications hardware (e.g., antennas, matching circuitry, etc.) and one or more processors having processing capability necessary to engage in wireless communication and control associated circuitry, including but not limited to hardware logic, computer readable instructions running on a processor, or any suitable combination thereof. Although wireless communication interface 78 may be implemented in any suitable manner, in an exemplary embodiment, wireless communication interface 78 may be implemented as a device which may include a cellular transceiver (not depicted), a processing unit (not depicted), and a memory (not depicted). In some embodiments, wireless communication interface 78 may allow payment-integrated mobile device 20 to communicate with payment server 40 via network 30.

Wired communication interface 80 may include any suitable interface for wired communication with other devices or a communication network, such as USB, Lightning, FireWire, Ethernet, any other suitable wired communication interface, or a suitable combination thereof. In some embodiments, wired communication interface 80 may allow payment-integrated mobile device 20 to communicate with payment server 40 either directly or via network 30.

In one embodiment, the user input interface 82 may provide various options for the user of the payment-integrated mobile device 20 to interact with applications and programs running on the payment-integrated mobile device 20. An exemplary user input interface 82 may include hardware and software for any suitable user interface, such as a touchscreen interface, camera, voice command interface, keyboard, mouse, gesture recognition interface, any other suitable user interface, or any combination thereof. The user input interface 82 can receive different types of user inputs such as touch inputs, voice inputs, fingerprints, iris scan, facial data, photographs, videos, text entry or other suitable types of inputs. The user input interface 82 may also include sensors that may allow the payment-integrated mobile device 20 to determine additional information about the user or the user's environment, such as accelerometers, gyroscopes, pressure sensors, magnetometers, time-of-flight sensors, infrared sensors, biometric sensors (e.g., fingerprint, iris, facial, etc.), airborne particulate sensors, and other related sensor types. In one embodiment, the user input interface 82 may be a touchscreen interface that displays an interactive user interface for programs and applications, such as a point-of-sale application running on the payment-integrated mobile device 20, and that can receive a touch input from a user.

The payment-integrated mobile device also include a payment terminal subsystem 200. In an embodiment, all of the components of the payment terminal subsystem may be located within a secure portion of the payment-integrated mobile device 20, for example, within a secure enclave defined by and protecting the components of the payment terminal subsystem. The secure enclave can include a variety of sensors, software routines, and devices to prevent and detect the components within the payment terminal subsystem 200 from being compromised by attackers attempting to access or otherwise acquire sensitive information from within the payment terminal subsystem 200. In an embodiment, the payment terminal subsystem may perform critical transaction processing information, and communicate with payment and other transaction processing servers through the application processing unit. In this manner, while the application processing unit may provide for control of certain user interface functions associated with a point of sale application, critical transaction processing functions and communications may be performed within the payment terminal processing system 200. In some embodiments, all messages and data that are exchanged between transaction servers and the payment terminal subsystem may be encrypted based on keys that can only be decrypted at those systems such that any intermediary processors or devices (e.g., application processing unit 72 or other intermediate devices) are not aware of any underlying transaction information or messages.

The payment terminal subsystem 200 can include a transaction processing unit (TPU) 100 and a plurality of payment interfaces (e.g., a chip card interface 202, a magnetic strip reader (MSR) device 204 and corresponding MSR interface 206, and an NFC interface 208) that are connected to corresponding ports or terminals on the transaction processing unit 100. In addition, the transaction processing unit 100 can be connected to the application processing 72 unit by a connection 85. The connection 85 can be configured to use communication interfaces such as serial communication interfaces or buses (e.g., I²C, SPI, UART, USB, and GPIO) to transfer information, data, signals, etc. between the application processing unit 72 and the transaction processing unit 100. In addition, one or more software drivers can be provided to one or both of the application processing unit 72 and the transaction processing unit 100 to enable the application processing unit 72 and the transaction processing unit 100 to communicate with each other via connection 85.

In some embodiments, the transaction processing unit 100 and application processing unit 72 may be integrated within a single processing unit. The transaction processing unit 100 and application processing unit 72 may be physically and/or logically isolated within the shared processing unit. Connection 85 may be a suitable communication bus as described herein, or in some embodiments, may be implemented as a logical connection between the transaction processing unit 100 and application processing unit 72 in which messages are exchanged between software modules running on the shared processing unit.

In one embodiment, the chip card interface 202 can include an EMV interface that is capable of receiving chip card 14. Chip card 14 may have contacts that engage and physically interface with corresponding contacts or contact pins of chip card interface 202 when chip card 14 is inserted into the chip card interface 202. Chip card interface 202 provides power and communications to an EMV chip of chip card 14 according to EMV specifications. The chip card interface 202 can be coupled to the transaction processing unit 100 by connections that can include power lines, data lines and ground lines.

The NFC interface 208 may provide for NFC communication with a contactless payment device such as NFC device 12 or chip card 14. In one embodiment, the NFC interface 208 can include appropriate circuitry for NFC communications such as electromagnetic compatibility (EMC) circuitry, matching circuitry, modulation circuitry, and measurement circuitry. Based on a signal provided by transaction processing unit 100, the NFC interface 208 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment-integrated mobile device 20 is inductively coupled to a contactless payment device 10, the contactless payment device 10 may also modulate the carrier signal via active or passive load modulation. By changing the tuning characteristics of the antenna of payment device 10 (e.g., by selectively switching a parallel load into the antenna circuit based on modulated data to be transmitted), the wireless carrier signal is modified at both the payment device 10 and payment-integrated mobile device 20, resulting in a modulated wireless carrier signal. In this manner, the payment device 10 is capable of sending modulated data to payment-integrated mobile device 20, which may be sensed by the NFC interface 208 and provided to the transaction processing unit 100 for processing. Based on the modulations of the carrier signal within near field 15, payment-integrated mobile device 20 and a contactless payment device 10 are able to communicate information such as payment information.

In one embodiment, in order to communicate information to payment device 10, transaction processing unit 100 changes the amplitude and/or phase of the wireless carrier signal based on data to be transmitted from transaction processing unit 100, resulting in a wireless data signal that is transmitted to the payment device 10. This signal is transmitted by the NFC interface 208 that is tuned to transmit at 13.56 MHz, and if the payment device 10 also has a suitably tuned antenna within the range of the near field 15 (e.g., 0 to 10 cm), the payment device 10 receives the wireless carrier signal or wireless data signal that is transmitted by NFC interface 208. In the case of a wireless data signal, processing circuitry of the payment device 10 is able to demodulate the received signal and process the data that is received from transaction processing unit 20.

The payment terminal subsystem 200 may also include a MSR device 204 and a corresponding MSR interface 206 for interfacing with a magnetic strip card. In some embodiments, the MSR device 204 may include a slot that guides a customer to swipe or dip the magnetized strip of the magnetic strip card such that the MSR device 204 and the MSR interface 206 can receive payment information from the magnetic strip card. The received payment information can then be provided to the transaction processing unit 100 for processing the payment-integrated mobile device 20. In one embodiment, the MSR device 204 and the MSR interface 206 can be combined into a single device that can provide the functionality of the MSR device 204 and the MSR interface 206.

In the embodiment of the payment-integrated mobile device 20 shown in FIG. 3, the payment-integrated mobile device 20 can include the application processing unit 72, the general memory 74, the power supply 76, the wireless communication interface 78, the wired communication interface 80, and the user interface 82 as described above with respect to FIG. 2. In some embodiments of the present disclosure, one or more dongles may be detachably coupled to the payment-integrated mobile device, and in an embodiment, the functionality of one or more of the payment interfaces may be integrated within one or more of the dongles. In the exemplary embodiment of FIG. 3, he payment terminal subsystem 200 can include the transaction processing unit 100 and an integrated NFC interface 208 as described above with respect to FIG. 2, while other payment interfaces may be accessible via the dongle. In the embodiment shown in FIG. 3, the payment terminal subsystem 200 does not include the chip card interface 202 and the MSR device 204 and the MSR interface 206, but may include one or more of these or other payment interfaces in alternate embodiments.

The payment-integrated mobile device 20 can have one or more terminals or ports 302, 304 that are able to receive a dongle 300 located on the exterior housing of the payment-integrated mobile device 20. The dongle 300 can be inserted into or engage with the corresponding port 302, 304 and provide additional functionality to the payment-integrated mobile device 20. In one embodiment, the dongle 300 can be a type of payment interface that can receive payment information from a payment device 10 such as a chip card interface or an MSR device (with MSR interface). As shown in FIG. 3, a dongle 300 can be connected to port 302, which port 302 can be electrically connected directly to the transaction processing unit 100. The direct connection between the port 302 and the transaction processing unit 100 permits any information, such as payment information, that is provided to the dongle 300 to be provided directly to the transaction processing unit 100 for subsequent processing.

In some embodiments, a dongle 300 can be connected to port 304, which port 304 can be electrically connected directly to the application processing unit 72. The connection between the port 304 and the application processing unit 72 results in any information, such as payment information, that is provided to the dongle 300 to first be provided to the application processing unit 72 before being provided to the transaction processing unit 100 via serial interface 85 for subsequent processing. In one embodiment, the dongle 300 connected to the port 304 (or the port 302) can be configured to encrypt information, such as payment information, received by the dongle 300 before the information is provided to the application processing unit 72 and/or the transaction processing unit 100. The transaction processing unit 100 can then be configured to decrypt the encrypted information from the dongle 300 and process the decrypted information according to transaction processing procedures. In an embodiment, both of the dongle 300 and the and the transaction processing unit 100 may have corresponding keys thereon, that allow for an additional layer of encryption to be applied on any communications between the dongle 300 and transaction processing unit 100. Such an additional layer of encryption may be applied in addition to any encryption or security applied by a payment interface.

In the embodiment of the payment-integrated mobile device 20 shown in FIG. 4, the payment-integrated mobile device 20 may include the application processing unit 72, the general memory 74, the power supply 76, the wireless communication interface 78 and the wired communication interface 80 as described above with respect to FIG. 2. The payment terminal subsystem 200 can include the transaction processing unit 100, the chip card interface 202, the MSR device 204, the MSR interface 206 and the NFC interface 208 as described above with respect to FIG. 2, although it will be understood that any suitable interfaces may be included within payment terminal subsystem 200 and that additional components or interfaces (e.g., an interface for a dongle 300) may be included within payment terminal subsystem 200. In the embodiment shown in FIG. 4, the payment terminal subsystem 200 includes user input interface 82, although in some embodiments (not depicted in FIG. 4, one or more user interface 82 components or all of user interface 82 may be located external to the payment terminal subsystem 200 and connect directly to a port or terminal of the transaction processing unit 100.

In embodiments, the transaction processing unit may receive information from the user interface 82 and determine whether to perform processing or operations on the received information, what operations and processing to perform, and whether to provide the received information or the results of the processing or operations to the application processing unit 72. The decision of whether and how to process the received data may be based on the type of data (e.g., touch, sound, sensor, video), the source of the data (e.g., which of a plurality of user interfaces), the content of the data (e.g., based on critical information such as payment or transaction information), settings (e.g., security requirements established based on communications with an application processing unit), and other suitable criteria. In an exemplary embodiment, processing may include payment processing and may require performing cryptographic operations, although in other embodiments other types of data may be processed.

In one embodiment, the payment terminal subsystem 200 can have circuitry to control the destination (e.g., the transaction processing unit 100 or the application processing unit 72) of information provided to the user input interface 82. If the user input into the user input interface 82 is to be secure, the transaction processing unit 100 can obtain the information from the user input interface 82 and can process the information from the user input interface 82 according to the corresponding security requirements. If the user input into the user input interface 82 is to be insecure, the transaction processing unit 100 can provide a bypass for the user input information from the user input interface 82 such that it is provided to the application processing unit 72 for processing without having to be processed by the transaction processing unit 100.

Figure 5:
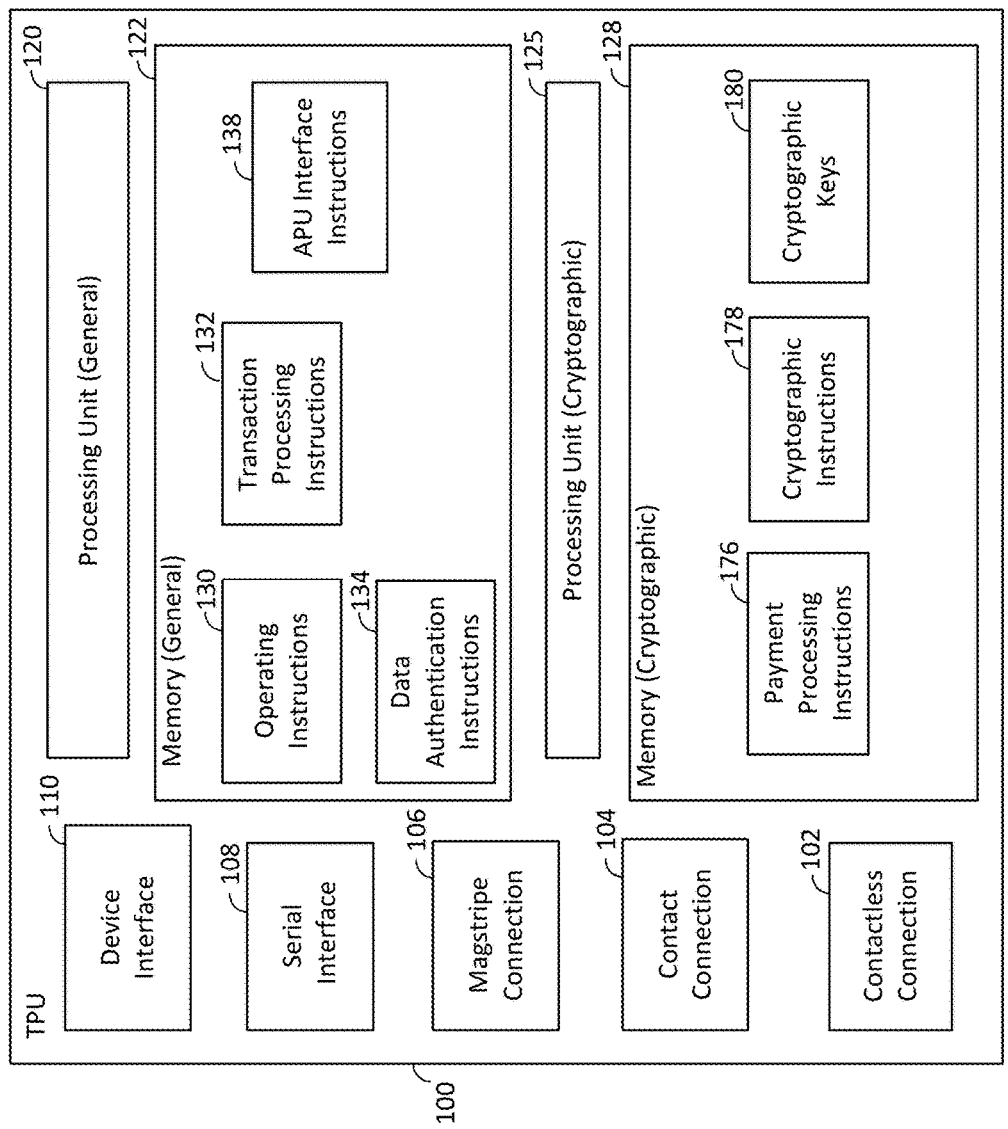
FIG. 5 depicts an illustrative block diagram of a transaction processing unit in accordance with some embodiments of the present disclosure.

FIG. 5 depicts a block diagram of a transaction processing unit 100 in accordance with some embodiments of the present disclosure. Although particular components are depicted in a particular arrangement in FIG. 5, it will be understood that transaction processing unit 100 may include additional components, one or more of the components depicted in FIG. 5 may not be included in transaction processing unit 100, and the components of transaction processing unit 100 may be rearranged in any suitable manner.

In one embodiment, transaction processing unit 100 includes a plurality of connections for payment interfaces (e.g., a contactless connection 102, contact connection 104, and magstripe connection 106), a serial interface 108, and a device interface 110. Transaction processing unit 100 may also include a general processing unit 120, general memory 122, a cryptographic processing unit 125, and cryptographic memory 128. Although in one embodiment the processing units and memories will be described as packaged in a transaction processing unit 100, and configured in a particular manner, it will be understood that general processing unit 120, general memory 122, a cryptographic processing unit 125, and cryptographic memory 128 may be packaged within the transaction processing unit in a variety of other suitable manners consistent with the present disclosure. It will also be understood that the functionality of transaction processing unit 100 may be embodied in a single chip or a plurality of chips, each including any suitable combination of processing units and memory to collectively perform the functionality of transaction processing unit 100 described herein.

In some embodiments, processing unit 120 of transaction processing unit 100 may be a suitable processor and may include hardware, software, memory, and circuitry as is necessary to perform and control the functions of transaction processing unit 100. Processing unit 120 may include one or more processors, and may perform the operations of transaction processing unit 100 based on instructions in any suitable number of memories and memory types. In some embodiments, processing unit 120 may have multiple independent processing units, for example a multi-core processor or other similar component. Processing unit 120 may execute instructions stored in memory 122 of transaction processing unit 100 to control the operations and processing of payment terminal subsystem 200.

In an exemplary embodiment, the processing unit 120 of transaction processing unit 100 may operate as a hub for controlling operations of the various components of payment terminal subsystem 200, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Transaction processing unit 100 may also include additional circuitry (not depicted) such as interface circuitry, analog front-end circuitry, security circuitry, and monitoring component circuitry. In one embodiment, the interface circuitry may include circuitry for interfacing with a wireless communication interface (e.g., Wi-Fi, Bluetooth classic, and Bluetooth low energy), circuitry for interfacing with a wired communication interface (e.g., USB, Ethernet, FireWire, and Lightning), and circuitry for interfacing with power supply 76 (e.g., power management circuitry, power conversion circuitry, and rectifiers).

In an exemplary embodiment, transaction processing unit 100 may perform functionality relating to the processing of payment transactions, interfacing with payment devices, cryptography, and other payment-specific functionality. In some embodiments, transaction processing unit 100 may include a cryptographic processing unit 125 for handling cryptographic processing operations that may or may not be associated with a payment transaction. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys 180, passwords, user information, etc.) may be securely stored by cryptographic memory 128 and processed by cryptographic processing unit 125.

General processing unit 120 and cryptographic processing unit 125 of transaction processing unit 100 may communicate with the other (e.g., processing unit 120 may communicate with cryptographic processing unit 125 and vice versa), for example, using any suitable internal bus and communication technique. In this manner, transaction processing unit 100 can process transactions and communicate information regarding processed transactions (e.g., with application processing unit 72) while performing required cryptographic operations.

The transaction processing unit 100 also may include circuitry for implementing a contactless connection 102 (e.g., analog front end circuitry for interfacing with the analog components of NFC interface 208) that provides signals for operating and communicating with NFC interface 208. In a variety of embodiments, different types of signals may be provided between the contactless connection 202 and the NFC interface 208, for example, based on whether the NFC interface 208 performs modulation of transmitted signals and demodulation of received signals, or whether some or all of this functionality is performed by the transaction processing unit 100.

Transaction processing unit 100 may also include circuitry for implementing a contact connection 104 (e.g., power and communication circuitry for directly interfacing with the chip card interface 202). In this manner, the transaction processing unit can provide and receive signals (e.g., power, ground, data, reset, etc.) with a chip card inserted at the chip card interface 202, and in some embodiments, engage in additional communications with the chip card interface 202.

Transaction processing unit 100 may also include circuitry for implementing a magstripe connection 106. Magstripe connection 106 may provide a connection to interface with magstripe interface circuitry such as MSR interface 206 and MSR device 204. However, in other embodiments magstripe can perform any suitable magstripe interface functionality, including directly providing and reading signals from the magstripe reader or communicating with a magstripe interfacing having internal processing capabilities.

Although in different embodiments the transaction processing unit 100 may communication with the application processing unit 72 using a variety of protocols and interfaces, in an embodiment the transaction processing unit 100 and application processing unit 72 may communication over serial interface 108. Serial interface 108 may include suitable communications hardware and/or circuitry necessary to engage in communication with the application processing unit 72 using a serial communication protocol (e.g., I2C, SPI, USB, UART, and GPIO). The serial interface 108 may provide for a single connection (i.e., 1 line or wire) between the application processing unit 72 and the transaction processing unit 100 or for multiple connections (i.e., more than 1 line or wire) between the application processing unit 72 and the transaction processing unit 100. In one embodiment, the serial interface 108 can be a GPIO pin on the transaction processing unit 100 that can be configured for communication with the application processing unit 72.

Device interface 110 may include any suitable interface for communication with other devices of the payment terminal subsystem 200 or the payment-integrated mobile device 20, such as dongle 300 or a user interface 82. In some embodiments, multiple device interfaces may facilitate the connection of multiple devices and device types to the transaction processing unit.

In some embodiments, general memory 122 may be a suitable memory as described herein, and may include a plurality of sets of instructions for controlling operations of payment terminal subsystem 200 and performing general transaction processing operations of payment terminal subsystem 200, such as operating instructions 130, transaction processing instructions 132, and data authentication instructions 134. In addition, memory 122 may also have APU interface instructions 136 to enable the transaction processing unit 100 to communicate with the application processing unit 72.

Operating instructions 130 may include instructions for controlling general operations of the transaction processing unit 100 and payment terminal subsystem 200, such as internal communications, power management, processing of messages, system monitoring, sleep modes, user interface response and control, operation of the contactless connection 102, contact connection 104, the serial interface 108, and the device interface 110, and the management of the other sets of instructions. In one embodiment, the operating instructions 130 may provide the operating system and applications necessary to perform most of the processing operations that are performed by the processing unit 120 of the transaction processing unit 100 of payment terminal subsystem 200.

Operating instructions 130 may also include instructions for interacting with a payment service system 50 at a payment server 40. In one embodiment, a payment service system 50 may be associated with the point-of-sale application of the payment-integrated mobile device 20. For example, the payment service system 50 may have information about payment terminals that are registered with the payment service system 50 (e.g., based on unique identifiers). This information may be used to process transactions with servers of the merchant and customer financial institutions, for providing analysis and reports to a merchant, and aggregating transaction data. The payment terminal subsystem 200 may process payment information (e.g., based on operation of transaction processing unit 100) and communicate the processed payment information to the point-of-sale application executed by the application processing unit 72, which in turn communicates with the payment service system 50. In this manner, messages from the payment terminal subsystem 200 may be forwarded to the payment service system 50 of payment server 40, such that the payment terminal subsystem 200 and payment service system 50 may collectively process the payment transaction.

Transaction processing instructions 132 may include instructions for controlling general transaction processing operations of the payment terminal subsystem 200, such as controlling the interaction between the payment terminal subsystem 200 and a payment device 10 (e.g., for interfacing with a payment device via the contactless connection 102 and contact connection 104), selecting payment processing procedures (e.g., based on a payment processing entity associated with a payment method), interfacing with the cryptographic processor 125, and other suitable aspects of transaction processing.

Transaction processing instructions 132 also may include instructions for processing payment transactions at payment terminal subsystem 200. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of payment-standard messages to exchange with a payment server (e.g., to exchange protocol-dependent information with the payment server), and other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact connection 104 and cryptographic processing unit 125) such as authorization responses, card user name, card expiration, etc.

Data authentication instructions 134 may include instructions for providing configuration information for a payment-integrated mobile device 20. The configuration information may include suitable information such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

APU interface instructions 136 may include instructions for interacting with the application processing unit 72. In one embodiment, the application processing unit 72 may be executing a point-of-sale application. The APU interface instructions 136 may include instructions for a complementary application to execute on processing unit 120 of transaction processing unit 100, in order to exchange information with the point-of-sale application executed by the application processing unit 72. At an appropriate time during a transaction (e.g., a payment transaction), the point-of-sale application may send a message to the transaction processing unit 100. The APU interface instructions 136 facilitate processing of the payment, for example, by acquiring payment information via the chip card interface 202, NFC interface 208 or MSR device 204 and MSR interface 206, and invoking the various resources of transaction processing unit 100 to process that payment information (e.g., by executing instructions stored in cryptographic memory 128 using cryptographic processing unit 125), and by generating responsive messages that are transmitted to the point-of-sale application executed by the application processing unit 72 via serial interface 108 and connection 85. In one embodiment, the APU interface instructions 136 can include a variety of message types and messages for communicating with the application processing unit 72, such as the following from Table 2:

TABLE 2

| Instruction/Message | Description |
| --- | --- |
| Read Done | Information obtained from payment device |
| Time Out | Time period expired before reading complete |
| Can't Read | Information from payment device unavailable |
| Buzzer | Activate/Deactivate buzzer mechanism on device |
| Light | Activate/Deactivate LED mechanism on device |
| UI Data | Process user interface data provided to serial interface |
| App Reader | Connect POS App to TPU via serial interface |
| Modify UI | Make changes to user interface display |

Although an exemplary embodiment of performing payment processing has been described herein, it will also be understood that other suitable processing operations may be performed by transaction processing unit 100 and that additional information and messages may be exchanged with the application processing unit 72. For example, information may be provided directly to the transaction processing unit (e.g., by a dongle 300 or a directly-connected user interface 82), and cryptographic operations may be performed by some or all of that data before providing the data to the application processing unit. In an embodiment, other operations involving encrypted communications between a mobile device and a remote server may be encrypted based on keys stored at the transaction processing unit 100 and the remote server, essentially protecting the underlying information from the application processing unit 72 or other intermediary devices and networks. In an embodiment, the application processing unit 72 can provide any suitable data to the transaction processing unit for cryptographic processing and/or to perform parallel processing.

Cryptographic processing unit 125 may be any suitable a processor as described herein, and, in some embodiments, may perform cryptographic functions for the processing of payment transactions and for other purposes such as the sending of confidential documents and email. For example, in some embodiments a cryptographic processing unit 125 may encrypt and decrypt data based on one or more encryption keys 180 stored in cryptographic memory 128, in a manner that isolates the encryption functionality from other components of payment-integrated mobile device 20 and protects the encryption keys 180 from being exposed to other components of payment-integrated mobile device 20. In one embodiment, the encryption keys 180 can be permanently stored in cryptographic memory 128 at the time of manufacture of the transaction processing unit 100 and are not updateable.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, and other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

In view of the structures and devices described supra, methods that can be implemented in accordance with the disclosed subject matter will be better appreciated with reference to the flowcharts of FIGS. 6-9. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a non-limiting flow diagram illustrating exemplary steps for processing a payment transaction with the transaction processing unit 100 in accordance with some embodiments of the present disclosure. In some embodiments, the transaction processing unit 100 can be used to receive payment information from a payment interface and to encrypt the received payment information for subsequent transmission to the payment server 40. The application processing unit 72 can notify the transaction processing unit 100 when a payment transaction has commenced and provide the encrypted payment information to the payment server 40 after the transaction processing unit 100 has completed processing the payment information.

At step 602, the transaction processing unit 100 can receive a command message from the application processing unit 72 indicating that a payment transaction has commenced. At step 604, the transaction processing unit 100 can parse the command message from the application processing unit 72 and identify information from the command message regarding the actions to be taken by the transaction processing unit 100. The information in the command message can include information such as an instruction to execute a payment transaction and information on the source of the payment information (e.g., chip card interface 202, NFC interface 208, MSR device 204 and MSR interface 206, and/or user input interface 82.).

Depending on the information received in the command message, the transaction processing unit 100 can acquire chip data from the chip card interface 202 at step 606, acquire NFC data from the NFC interface 208 at step 608 and/or acquire user data from the MSR device 204 and MSR interface 206 and/or user input interface 82 at step 610.

At step 612, the transaction processing unit 100 can encrypt the payment information received from the chip card interface 202, NFC interface 208, MSR device 204 and MSR interface 206, and/or user input interface 82. The transaction processing unit 100 can encrypt the data using the cryptographic processor 125, cryptographic instructions 178, and the cryptographic keys 180. After encrypting the payment information, the transaction processing unit 100 can identify protocol-dependent information for inclusion in the response message to the application processing unit 72. The response message from the transaction processing unit 100 can include the encrypted payment information and other protocol-dependent information regarding the payment transaction according to the transaction processing instructions 132 (e.g., based on a payment standard protocol such as EMV) and the command message from the application processing unit 72.

At step 616, the transaction processing unit 100 can transmit the response message with the encrypted payment information to the application processing unit 72 via serial interface 108 and serial connection 85 and the process ends.

FIG. 7 depicts a non-limiting flow diagram illustrating exemplary steps for processing a payment transaction by the application processing unit 72 in accordance with some embodiments of the present disclosure. In some embodiments, the application processing unit 72 can execute a point-of-sale application to enable a merchant to process payment transactions from customers.

At step 702, the application processing unit 72 can receive a transaction input indicating that a payment transaction is being commenced. In one embodiment, the transaction input can be an input to the application processing unit 72 indicating the selection of a payment type by either the customer or the merchant. However, in other embodiments, other types of transaction inputs can be received by the application processing unit 72 to indicate that a payment transaction has commenced. When the application processing unit 72 receives the transaction input, the application processing unit 72 can then generate a command message for the transaction processing unit 100 at step 704. The command message from the application processing unit 72 can include information regarding the commencement of a payment transaction, the source of the payment information (e.g., chip card interface 202, NFC interface 208, or MSR device 204 and MSR interface 206), and the format of the response message to be provided to the application processing unit 72. At step 706, the application processing unit 72 can transmit the command message to the transaction processing unit 100 via serial connection 85.

The application processing unit 72 can receive the response message from the transaction processing unit 100 via connection 85 once the transaction processing unit 100 has completed processing of the payment information. In one embodiment, the transaction processing unit 100 can process the payment information according to the process shown in FIG. 6. However, the transaction processing unit 100 can process payment information according to other processes in other embodiments.

After the application processing unit 72 has received the response message from the transaction processing unit 100, the application processing unit 72 can transmit the response message from the transaction processing unit 100 to the payment server 40 via network 30 and the process ends. In one embodiment, the application processing unit 72 can provide the response message to the payment server 40 without modifications. In other words, the application processing unit 72 can forward the response message to the payment server 40. However, in other embodiments, the application processing unit 72 can include additional information with the response message from the transaction processing unit 100 before transmitting the response message to the payment server 40.

FIG. 8 depicts a non-limiting flow diagram illustrating exemplary steps for processing a user input received at the user input interface 82 in accordance with some embodiments of the present disclosure. In some embodiments, such as the embodiment of FIG. 4, the user input interface 82 can be used to receive inputs from a user of the payment-integrated mobile device 20 and provide the user inputs to the transaction processing unit 100. The user inputs provided to the user input interface may be associated with a payment transaction and have to be processed by the transaction processing unit 100 for security reasons. However, not all user inputs are associated with critical (e.g., payment) transactions and, as such, do not have to be processed under the security requirements implemented by the transaction processing unit 100. These other user inputs (i.e., the non-payment transaction user inputs) can be processed by the application processing unit 72.

The process of FIG. 8 begins at step 802 with the transaction processing unit 100 receiving a command message from the application processing unit 72 indicating that a user input is going to be provided to the user input interface 82. At step 804, the transaction processing unit 100 can parse the command message from the application processing unit 72 and identify information from the command message regarding the actions to be taken by the transaction processing unit 100. The information in the command message can include information such as information on the type of user input to be provided to the user input interface 82, information on whether the user input is associated with a payment transaction, an instruction to encrypt data if the user input has to be encrypted, but is not associated with a payment transaction, and information on the format of the message with the encrypted user input to be provided to the application processing unit 72.

At step 806, the transaction processing unit 100 can receive the user input from the user input interface 82. Once the user input is received from the user input interface 82, the transaction processing unit 100 can determine if the user input has to be encrypted at step 808 based on the identified information from the command message. Once the determination has been made at step 808, processing may continue to step 810 or 812 based on the result of the encryption requirement determination. In the embodiment of FIG. 8, if it is determined that no encryption of the user input is required, the sequence may proceed to step 810. If it is determined that the user input has to be encrypted in step 808, the sequence may proceed to step 812.

At step 810, the transaction processing unit 100 can perform a bypass function and provide the user input directly to the application processing unit 72 via serial interface 108 and connection 85 without processing the user input and the process ends. In one embodiment, the corresponding port of the transaction processing unit 100 connected to the user input interface 82 can be connected to a switching device that can route the user input to either the serial interface 108 if no encryption of the user input is required or the cryptographic processing unit 125 if encryption of the user input is required. However, in other embodiments, other techniques for bypassing the cryptographic processing unit 125 can be used.

If processing has continued to step 812, the transaction processing unit 100 can encrypt the user input at step 812. The transaction processing unit 100 can encrypt the user input using the cryptographic processor 125, cryptographic instructions 178, and the cryptographic keys 180 according to the information in the command message. At step 814, the transaction processing unit 100 can transmit the response message with the encrypted user input data to the application processing unit 72 via serial interface 108 and serial connection 85 and the process ends.

FIG. 9 depicts a non-limiting flow diagram illustrating exemplary steps for encrypting data from the application processing unit 72 with the transaction processing unit 100 in accordance with some embodiments of the present disclosure. In some embodiments, the application processing unit 72 may have to transmit information that is not related to a payment transaction in an encrypted form (e.g., information associated with a confidential email or document). To perform the encryption of the information, the application processing unit 72 can engage the transaction processing unit 100 to perform the encryption of the information since the transaction processing unit 100 already has the appropriate cryptographic components (e.g., cryptographic processor 125, cryptographic instructions 178, and cryptographic keys 180).

At step 902, the transaction processing unit 100 can receive a command message from the application processing unit 72 indicating that the application processing unit 72 is going to transmit information to be encrypted to the transaction processing unit 100. At step 904, the transaction processing unit 100 can parse the command message from the application processing unit 72 and identify information from the command message regarding the actions to be taken by the transaction processing unit 100. The information in the command message can include information such as an instruction to encrypt data, the format of the data being received, and the format for the encrypted data to be used when providing the encrypted data back to the application processing unit 72. In some embodiments (not depicted in FIG. 9), the command message may also include the data to be encrypted.

At step 906, the transaction processing unit 100 can receive the data to be encrypted from application processing unit 72 at serial interface 108. Once the data is received from application processing unit 72, the transaction processing unit 100 can encrypt the data at step 908. The transaction processing unit 100 can encrypt the data using the cryptographic processor 125, cryptographic instructions 178, and the cryptographic keys 180 according to the information in the command message. At step 910, the transaction processing unit 100 can transmit the response message with the encrypted data to the application processing unit 72 via serial interface 108 and serial connection 85 and the process ends.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for a mobile device to facilitate the communication of transaction information between an application running on the mobile device and a remote transaction server, the system comprising:
   a payment interface configured to communicate with a payment device to exchange transaction data with the payment device;
   a plurality of user input components, wherein each of the plurality of user input components provides user input data in response to a user input;
   an internet protocol (IP) communication interface;
   a data interface configured to exchange messages via a data communication protocol;
   a transaction processing unit electrically coupled to the payment interface to exchange the transaction data with the payment device and electrically coupled to the data interface to exchange the messages via the data communication protocol;
   a transaction processing memory coupled to the transaction processing unit, wherein the transaction processing memory is configured to store a plurality of cryptographic keys, command message identifying information for each of a plurality of command message types that are exchanged by the transaction processing unit over the data interface, response message identifying information for each of a plurality of the response message types that are exchanged by the transaction processing unit over the data interface, and transaction processing instructions, wherein when executed by the transaction processing unit the transaction processing instructions cause the transaction processing unit to:
   receive a first command message of the command message types via the data interface;
   identify first command message identifying information based on the first command message;
   acquire the transaction data from the payment device via the payment interface when the first command message identifying information corresponds to a payment request;
   encrypt the acquired data based on one or more of the plurality of cryptographic keys;
   identify first response message identifying information based on the first command message and the acquired encrypted data; and
   transmit a first response message of the response message types via the data interface;
   an application processing unit coupled to at least one of the plurality of user input components to receive transaction inputs, coupled to the data interface to exchange the messages via the data communication protocol, and to the IP communication interface to exchange transaction processing messages with the transaction server; and
   an application memory coupled to the application processing unit, the application memory having application instructions thereon that when executed by the application processing unit cause the application processing unit to:
   receive a first transaction input of the transaction inputs;
   generate the first command message based on the first transaction input;
   transmit the first command message to the transaction processing unit via the data interface;
   receive the first response message from the transaction processing unit via the data interface; and
   transmit a first transaction processing message of the transaction processing messages to the transaction server via the IP communication interface, wherein the first transaction processing message includes at least the encrypted acquired data from the first response message.

2. The system of claim 1, wherein a user input component of the plurality of user input components comprises a touchscreen interface.

3. The system of claim 2, wherein the transaction processing instructions cause the transaction processing unit to:

acquire touch data from the touchscreen interface when the first command message identifying information corresponds to a touch data request; and forward the acquired touch data directly to the data interface based on the first command message identifying information.

4. The system of claim 1, wherein the transaction processing instructions cause the transaction processing unit to:

receive a second command message of the command message types via the data interface;

receive data from the application processing unit via the data interface;

encrypt the received data based on one or more of the plurality of cryptographic keys and the second message; and transmit a second response message including the encrypted received data via the data interface.

5. A method of processing a payment transaction at a payment terminal, the method comprising:

exchanging, by a payment interface of the payment terminal, transaction data with a payment device;

receiving, at each of a plurality of user input components of the payment terminal, user input data in response to a user input;

exchanging, by a data interface of the payment terminal, messages via a data communication protocol;

receiving, at a transaction processing unit of the payment terminal, transaction data from the payment device;

receiving, at the transaction processing unit, the messages via the data communication protocol;

receiving, at the transaction processing unit via the data interface, a first command message of a plurality of command message types;

identifying, by the transaction processing unit, first command message identifying information based on the first command message;

acquiring, by the transaction processing unit via the payment interface, the transaction data when the first command message identifying information corresponds to a payment request;

encrypting, by the transaction processing unit, the acquired data based on one or more of the plurality of cryptographic keys;

identifying, by the transaction processing unit, first response message identifying information based on the first command message and the acquired encrypted data;

transmitting, by the transaction processing unit via the data interface, a first response message of the response message types;

receiving, at an application processing unit of the payment terminal and from at least one of the plurality of user input components, a first transaction input;

generating, by the application processing unit, the first command message based on the first transaction input;

transmitting, by the application processing unit via the data interface, the first command message to the transaction processing;

receiving, at the application processing unit via the data interface, the first response message from the transaction processing unit; and transmitting, by the application processing unit via a IP communication interface, a first transaction processing message to a transaction server, wherein the first transaction processing message includes at least the encrypted acquired data from the first response message.

6. The method of claim 5, wherein a user input component of the plurality of user input components comprises a touchscreen interface.

7. The method of claim 6, further comprising:

acquiring, by the transaction processing unit, touch data from the touchscreen interface when the first command message identifying information corresponds to a touch data request; and forwarding, by the transaction processing unit, the acquired touch data directly to the data interface based on the first command message identifying information.

8. The method of claim 5, further comprising:

receiving, by the transaction processing unit via the data interface, a second command message of the command message types;

receiving, by the transaction processing unit, data from the application processing unit;

encrypting, by the transaction processing unit, the received data based on one or more of the plurality of cryptographic keys and the second message; and transmitting, by the transaction processing unit, a second response message including the encrypted received data via the data interface.

9. A plurality of non-transitory computer-readable storage mediums comprising transaction instructions and application instructions stored therein, wherein when the transaction instructions are executed by a transaction processing unit, cause the transaction processing unit to perform operations comprising:

exchanging, via a payment interface, transaction data with a payment device;

receiving, from each of a plurality of user input components, user input data in response to a user input;

exchanging, via a data interface, messages via a data communication protocol;

receiving transaction data from the payment device;

receiving the messages via the data communication protocol;

receiving, via the data interface, a first command message of a plurality of command message types;

identifying first command message identifying information based on the first command message;

acquiring the transaction data when the first command message identifying information corresponds to a payment request;

encrypting the acquired data based on one or more of the plurality of cryptographic keys;

identifying first response message identifying information based on the first command message and the acquired encrypted data; and transmitting a first response message of the response message types; and wherein when the application instructions are executed by an application processing unit, cause the application processing unit to perform operations comprising:

receiving, from at least one of the plurality of user input components, a first transaction input;

generating the first command message based on the first transaction input;

transmitting, via the data interface, the first command message to the transaction processing;

receiving, via the data interface, the first response message from the transaction processing unit; and transmitting, via a IP communication interface, a first transaction processing message to a transaction server, wherein the first transaction processing message includes at least the encrypted acquired data from the first response message.

10. The non-transitory computer-readable storage medium of claim 9, wherein a user input component of the plurality of user input components comprises a touchscreen interface.

11. The non-transitory computer-readable storage medium of claim 10, wherein the transaction instructions further cause the transaction processing unit to perform operations comprising:
  acquiring touch data from the touchscreen interface when the first command message identifying information corresponds to a touch data request; and
  forwarding the acquired touch data directly to the data interface based on the first command message identifying information.

12. The non-transitory computer-readable storage medium of claim 11, wherein the transaction instructions further cause the transaction processing unit to perform operations comprising:
  receiving, via the data interface, a second command message of the command message types;
  receiving data from the application processing unit;
  encrypting the received data based on one or more of the plurality of cryptographic keys and the second message; and
  transmitting a second response message including the encrypted received data via the data interface.

* * * * *